(12) United States Patent
Åberg et al.

(10) Patent No.: US 7,689,798 B2
(45) Date of Patent: Mar. 30, 2010

(54) METHOD AND DEVICE FOR DETERMINING SIZE OF MEMORY FRAMES

(75) Inventors: Patrik Åberg, Malmö (SE); Ola Nilsson, Åkarp (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 440 days.

(21) Appl. No.: 11/576,848

(22) PCT Filed: Oct. 6, 2005

(86) PCT No.: PCT/EP2005/010765

§ 371 (c)(1),
(2), (4) Date: Jul. 3, 2007

(87) PCT Pub. No.: WO2006/037635

PCT Pub. Date: Apr. 13, 2006

(65) Prior Publication Data

US 2007/0247469 A1    Oct. 25, 2007

Related U.S. Application Data

(60) Provisional application No. 60/617,899, filed on Oct. 11, 2004.

(30) Foreign Application Priority Data

Oct. 7, 2004    (EP)    .................................. 04023881

(51) Int. Cl.
G06F 5/01    (2006.01)
G06F 12/02    (2006.01)
(52) U.S. Cl. ........................ 711/171; 709/236; 710/30
(58) Field of Classification Search ................ 711/170, 711/171, 165; 709/236; 710/30
See application file for complete search history.

(56) References Cited

U.S. PATENT DOCUMENTS

| 5,388,013 | A  | * | 2/1995 | Nakamura | .................... | 360/48 |
| 6,088,777 | A  |   | 7/2000 | Sorber et al. | | |
| 6,442,661 | B1 | * | 8/2002 | Dreszer | ...................... | 711/170 |
| 2003/0142694 | A1 | * | 7/2003 | Takano | ........................ | 370/477 |
| 2003/0156012 | A1 | * | 8/2003 | Omidi et al. | ........... | 340/310.01 |

(Continued)

OTHER PUBLICATIONS

Wilson, P. R. et al.: "Dynamic Storage Allocation: A Survey and Critical Review" Memory Management. International Workshop IWMM. Proceedings, 1995, pp. 1-78, XP002262845.

(Continued)

*Primary Examiner*—Matt Kim
*Assistant Examiner*—Hal Schnee
(74) *Attorney, Agent, or Firm*—Potomac Patent Group PLLC

(57) ABSTRACT

A method for determining the size of each of a predetermined number of memory frames to be allocated for storing data blocks in a memory, and a processing device for implementing the method. The method comprises determining a data block size distribution for at least one set of data blocks. A data block size of the data block size distribution is eliminated iteratively until the number of data block sizes corresponds to the number of sizes of the memory frames. The data block sizes to merge are selected by means of a slack prediction algorithm. The sizes of the memory frames are determined as the data block sizes of the distribution which remain after the elimination.

17 Claims, 5 Drawing Sheets

U.S. PATENT DOCUMENTS

2004/0100991 A1* 5/2004 Samadi et al. .............. 370/473
2005/0229139 A1* 10/2005 Tsai et al. .................... 716/17
2007/0195820 A1* 8/2007 So et al. ..................... 370/470

OTHER PUBLICATIONS

Madsen, J. et al.: "Embedded System Synthesis under Memory Contraints" 7th International Workshop on Hardware/Software Codesign. Rome, Italy, May 3-5, 1999, New York, NY: ACM, US, May 3, 1999, pp. 188-192, XP000903927. ISBN 1-58113-132-1.

Shang, L. et al. "Hardware-software co-synthesis of low power real-time distributed embedded systems with dynamically reconfigurable FPGAs" Design Automation Conference, 2002. Proceedings of ASP-DAC 2002. 7th Asia and South Pacific and the 15th International Conference on VLSI Design. Proceedings. Bangalore, India Jan. 7-11, 2002, Los Alamitos, CA, USA, IEEE Comput. Soc, US, Jan. 7, 2002, pp. 345-352, XP010588126. ISBN: 0-7695-1441-3.

International Search Report, mailed May 11, 2006, in connection with International Application No. PCT/EP2005/010765.

International Preliminary Report on Patentability, mailed Mar. 26, 2007, in connection with International Application No. PCT/EP2005/010765.

* cited by examiner

| Process A | | Process B | | Process C | |
|---|---|---|---|---|---|
| 101 | 5 | 111 | 4 | 121 | 8 |
| 102 | 11 | 112 | 11 | 122 | 5 |
| 103 | 4 | 113 | 5 | 123 | 11 |
| 104 | 8 | 114 | 3 | 124 | 4 |
| 105 | 10 | 115 | 6 | 125 | 10 |
| 106 | 6 | 116 | 6 | | |
| | | 117 | 8 | | |

| Number of blocks | Data block size | Predicted slack |
|---|---|---|
| 1 | 3 | 1(4-3)=1 |
| 3 | 4 | 3(5-4)=3 |
| 3 | 5 | 3(6-5)=3 |
| 3 | 6 | 3(8-6)=6 |
| 3 | 8 | 3(10-8)=6 |
| 2 | 10 | 2(11-10)=2 |
| 3 | 11 | - |

| Total slack | 1 |
|---|---|

*Fig 4a*

| Number of blocks | Data block size | Predicted slack |
|---|---|---|
| 4 | 4 | 4(5-4)=4 |
| 3 | 5 | 3(6-5)=3 |
| 3 | 6 | 3(8-6)=6 |
| 3 | 8 | 3(10-8)=6 |
| 2 | 10 | 2(11-10)=2 |
| 3 | 11 | - |

| Total slack | 3 |
|---|---|

*Fig 4b*

| Number of blocks | Data block size | Predicted slack |
|---|---|---|
| 4 | 4 | 4(5-4)=4 |
| 3 | 5 | 3(6-5)=3 |
| 3 | 6 | 3(8-6)=6 |
| 3 | 8 | 3(11-8)=9 |
| 5 | 11 | - |

| Total slack | 6 |
|---|---|

*Fig 4c*

| Number of blocks | Data block size | Predicted slack |
|---|---|---|
| 4 | 4 | 4(6-4)=8 |
| 6 | 6 | 6(8-6)=12 |
| 3 | 8 | 3(11-8)=9 |
| 5 | 11 | - |

| Total slack | 14 |
|---|---|

*Fig 4d*

| Number of blocks | Data block size | Predicted slack |
|---|---|---|
| 10 | 6 | - |
| 3 | 8 | - |
| 5 | 11 | - |

| Total slack | 14 |
|---|---|

*Fig 4e*

| Number of blocks | Data block size | Predicted slack | SPV | WSPV |
|---|---|---|---|---|
| 4 | 4 | 4 | 22 | 8.5 |
| 3 | 5 | 3 | 29 | 9.5 |
| 3 | 6 | 6 | 31 | 12.25 |
| 3 | 8 | 9 | 22 | 12.25 |
| 5 | 11 | - | - | |

*Fig 5a*

| Number of blocks | Data block size | Predicted slack |
|---|---|---|
| 7 | 5 | 7 |
| 3 | 6 | 6 |
| 3 | 8 | 9 |
| 5 | 11 | - |

| Slack prediction value | 22 |
|---|---|

*Fig 5b*

| Number of blocks | Data block size | Predicted slack |
|---|---|---|
| 4 | 4 | 8 |
| 6 | 6 | 12 |
| 3 | 8 | 9 |
| 5 | 11 | - |

| Slack prediction value | 29 |
|---|---|

*Fig 5c*

| Number of blocks | Data block size | Predicted slack |
|---|---|---|
| 4 | 4 | 4 |
| 3 | 5 | 9 |
| 6 | 8 | 18 |
| 5 | 11 | - |

| Slack prediction value | 31 |
|---|---|

*Fig 5d*

| Number of blocks | Data block size | Predicted slack |
|---|---|---|
| 4 | 4 | 4 |
| 3 | 5 | 3 |
| 3 | 6 | 15 |
| 8 | 11 | - |

| Slack prediction value | 22 |
|---|---|

*Fig 5e*

| Number of blocks | Data block size | Predicted slack |
|---|---|---|
| 7 | 5 | - |
| 3 | 6 | - |
| 3 | 8 | - |
| 5 | 11 | - |

*Fig 5f*

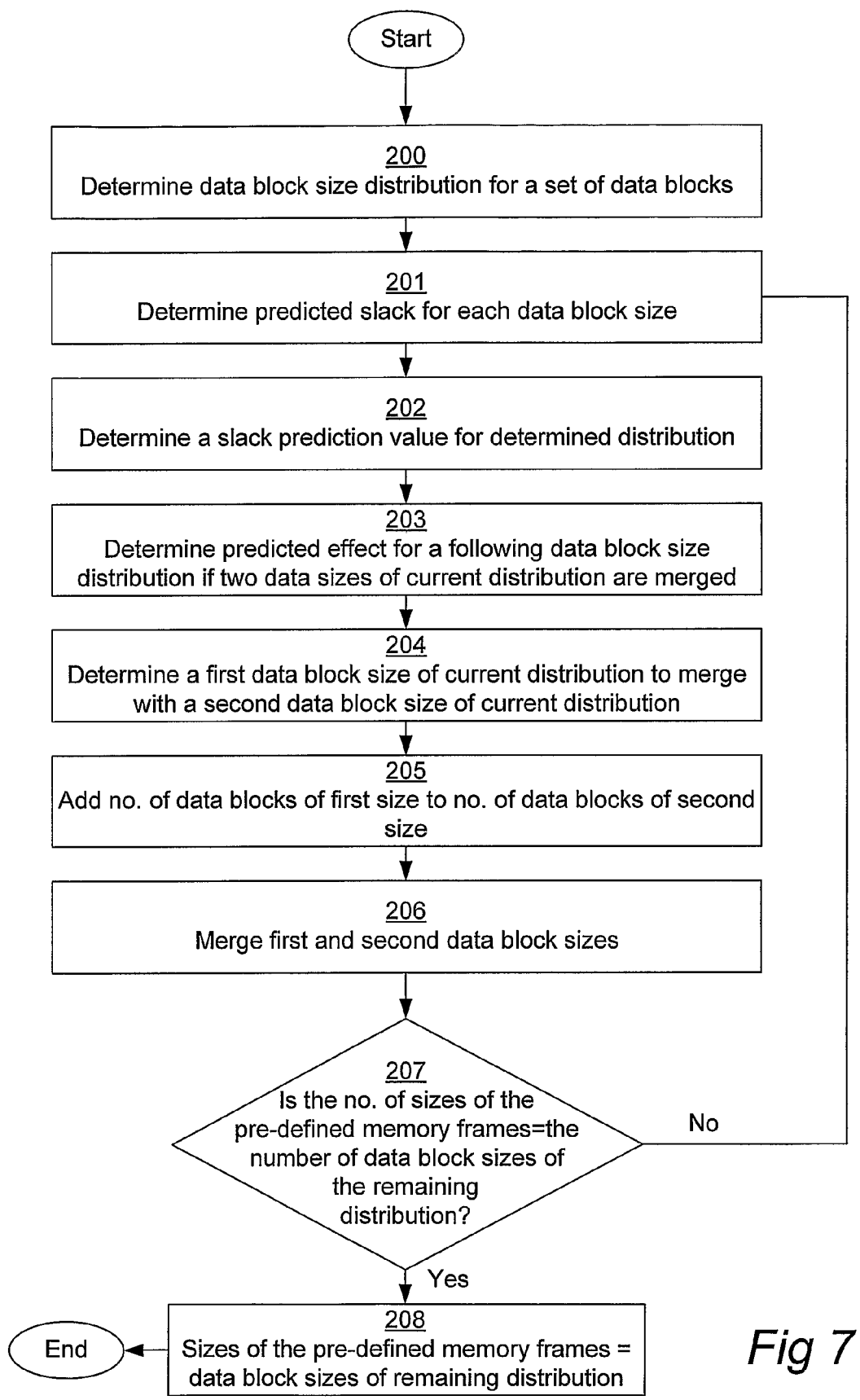

METHOD AND DEVICE FOR DETERMINING SIZE OF MEMORY FRAMES

This application is a national-phase counterpart filed under 35 U.S.C. §371 of International Patent Application No. PCT/EP2005/010765 filed on Oct. 6, 2005, which is a non-provisional of U.S. Provisional Patent Application No. 60/617,899 filed on Oct. 11, 2004. This application claims the benefit of the filing dates of those applications. This application also claims priority to European Patent Application No. 04023881.8 filed on Oct. 7, 2004.

TECHNICAL FIELD OF THE INVENTION

The present invention relates to a method for determining the sizes of memory frames, which have pre-defined sizes and are used for storing data blocks in a memory. The invention also relates to a processing device adapted to implement the method according to the invention.

DESCRIPTION OF RELATED ART

Dynamic memory allocation is used for allocating memory in a real-time system as a need for memory resources occurs. Dynamic allocation of memory resources in a memory allocation device may be limited to a number of pre-defined memory frame sizes, or a number of memory frames having different sizes, i.e. each memory frame may store a number of data bits. The storage capacity of each memory frame need not correspond to its actual size, as certain bits of the memory frame may be used for memory management. Having memory frames with pre-defined sizes makes it possible to provide a memory allocator that behaves very predictable in terms of execution time for allocation and de-allocation of memory. However, it also makes an impact on performance.

One drawback with a memory allocation scheme using memory frames with pre-defined sizes is a phenomenon called internal fragmentation or slack. This means that if a requested memory size, i.e. the size of a data block to be stored, is less than the size of the smallest memory frame that has the capacity of storing the data block of that size, the number of bytes that differ will not be used, i.e. become slack, which is a.k.a. internal fragmentation.

The problem with slack has impact on all areas wherein dynamic memory allocation is utilized. Two such areas are in processing of processes where memory is lost to slack for each process, and in signal buffers where memory is lost to slack for each allocated signal. However, the memory requirements of a certain process is known. Thus, it is possible to set the sizes of the memory frames such that as little slack as possible is caused. Also, if the possible sizes of data blocks of a signal is known, the sizes of the memory frames may be set to a predicted optimal configuration by predicting the signal sizes, e.g. by running the system, in which the dynamic memory allocation device should be implemented, for different use-cases.

In systems known in the art, the sizes of the memory frames may be guessed by a human being who looks at all different data block sizes of a process/signal and the number of data blocks of each data block size, and then trims the sizes of the memory frames to appropriate sizes. He has to do this over and over again for every new set of data block sizes of a process/signal. This is a problem as it takes a lot of time, and occasionally the sizes of the memory frames determined manually are not optimal at all.

In embedded systems, such as a mobile terminal, wherein the memory resources are limited, setting up a dynamic memory allocation device to optimal sizes of pre-defined memory frames has a large impact on the slack. In such a system, the number of processes may e.g. in the range of 10-30 for a small system and up to hundreds of processes for a larger system. Moreover, each process may comprise several hundred different data block sizes, but the different sizes of the memory frames may only be in the range of a few up to some tens. Similarly, the number of different sizes of the data blocks of signals may be in the same range as the number of different sizes of data blocks of a process. Savings in terms of memory resources in such electronic devices have an impact on production costs, the larger system the larger impact. If the memory resources can be limited due to reduction of slack, the production cost may be lowered.

SUMMARY OF THE INVENTION

It is an object of the invention to provide a method and a device for determining the size of at least one memory frame for a memory means, which will cause as little slack as possible when data blocks of different sizes are stored in memory frames having said determined size(s) in said memory means.

According to a first aspect of the invention, the object is achieved by a method for determining the size of each of a predetermined number of memory frames to be allocated for storing data blocks in a memory. The method comprises determining a data block size distribution for at least one set of data blocks. At least one data block size of the data block size distribution is iteratively eliminated until the number of data block sizes corresponds to the number of sizes of the memory frames. Said at least one data block size is merged with a first data block size of the distribution to generate a merged data block size. The first data block size is larger than the at least one data block size and the size of the merged data block size corresponds to the first data block size. The data block sizes to merge are selected by means of a slack prediction algorithm. The sizes of the memory frames are determined as the data block sizes of the distribution, which remain after the elimination.

The method may also comprise adding the number of data blocks having the at least one data block size to the number of data blocks having the first data block size when the at least one data block size is merged with the first data block size. For each data block size except the largest data block size of the distribution and for each iteration, the predicted slack that would result if the at least one data block size would be incorporated into a larger data block size of the determined distribution may be determined. The larger data block size may be the next larger data block size of the determined distribution, which has not been eliminated. Alternatively, any larger data block size that has not been eliminated is selected as the larger data block size.

The slack prediction algorithm may comprise, for each iteration, to determine which of the data block sizes of the distribution, which has not been eliminated, would generate the lowest slack if it would be incorporated into a larger data block size. Then, the determined data block size is selected to be one of said at least one data block size. The slack prediction algorithm may also comprise, for each iteration, generating a slack prediction value indicative of the total predicted slack for the data block sizes of the distribution that have not been eliminated.

The set of data blocks may relates to data blocks for at least one predetermined process of a system comprising the memory. Alternatively, the set of data block relates to data blocks of at least one signal. The data block size distribution may be determined in run-time e.g. when data blocks are written into a memory. Then the method according to the invention may be run at any time when processing capacity is available or in response to predetermined events, such as at maximum memory write/read per time unit The effect in at least one following possible data block size distribution of eliminating a certain data block size of a current distribution may be checked before any data block size is eliminated in a current distribution. Any number of iterations for determining possible following distributions may be generated, and be adaptively set, such as in dependence of the number of data block sizes of the distribution.

A slack prediction value for each of the current and the possible data block size distributions may be generated. Then, one of said at least one data block sizes may be selected from the current data block size distribution as the data block size that would generate the lowest predicted slack in total in the current and the following iteration. Also, a second of said at least one data block size may be selected from the following iteration, and merged with another data block size of the following data block distribution, wherein a plurality of data blocks may be merged in each iteration.

The first data block size, which is to be merged with the at least one data block size, may be the data block size, which remains in the distribution, following the largest data block size of said at least one data block size within the distribution.

According to a second aspect of the invention, the object is achieved by a processing device configured to implement the method of the invention. The processing device may be provided in a portable electronic device having relatively small processing capability, or in a computer having larger processing capability. The processor may also be adapted to implement the method according to the invention in run-time.

Further embodiments of the invention are defined in the dependent claims.

It is an advantage of the invention that the sizes of the memory frames need not be determined manually, and the usage of the memory resources decreased. Also, if the method according to the invention is used in run-time, the size of the memory frames may be adaptively adjusted as the memory requirements changes. Also, adjusting the sizes of the memory frame to actual needs saves memory resources, and thus also cost. The sizes of the memory frames may be changed more often than if it is made manually. Also, it is possible to easily adjust the sizes of the memory frames to new system platforms. Furthermore, it is an advantage of the invention that the resulting slack is minimized, whereby the memory requirements may be optimized.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Further objects, features and advantages of the invention will appear from the following detailed description of the invention, reference being made to the accompanying drawings, in which:

FIGS. 4a-4e are tables illustrating a first embodiment of the iterative reduction of data block sizes according to the invention;

FIGS. 5a-5f are tables illustrating a second embodiment of the iterative reduction of data block sizes according to the invention;

FIG. 7 is a flow-chart of one embodiment of the method according to the invention.

DETAILED DESCRIPTION OF EMBODIMENTS

Figure 1:
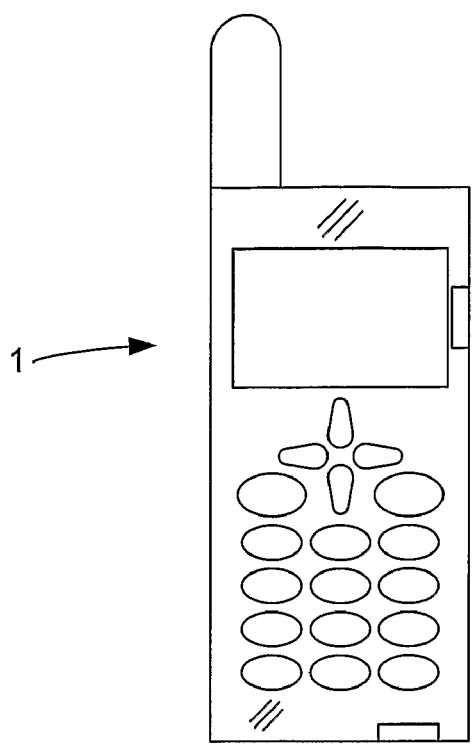
FIG. 1 is a front-view of a mobile telephone having a memory, which is set up according to the method of the invention.

FIG. 1 illustrates an electronic apparatus in which the device and method according to the invention may be implemented. The electronic apparatus is in this example embodied as, but not limited to, a mobile telephone 1. As memory resources are restricted in a portable electronic device, and the cost of adding a larger memory leads to an increased cost, the present invention is useful in portable electronic devices, in which these parameters may be prioritized, such as in a mobile radio terminal, a pager, a communicator, an electronic organizer, a smartphone, or a personal digital assistant. However, the invention may also be implemented in or by a stationary electronic device, such as a computer. More particularly, the method may be implemented by any processor and implemented for a memory of another electronic device. For illustrative purposes, reference will only be made to a mobile telephone 1 in the following.

The mobile telephone 1 comprises various circuits for performing various processes, such as communicating with a network, e.g. providing/receiving location data to/from a base station, clock functions, scanning of incoming signals, paging processes etc. In a mobile telephone 1, many processes are running just to make the mobile telephone 1 work properly. There may be hundreds of such processes may in a mobile telephone e.g. adapted for communication in a WCDMA (Wideband Code Division Multiple Access) network. On top of that, processes may, but need not, be added due to design changes of the mobile telephone and/or for additional functional features, such as for a camera, a notebook, a phonebook and a media-player function, of the mobile telephone 1.

Figure 2:
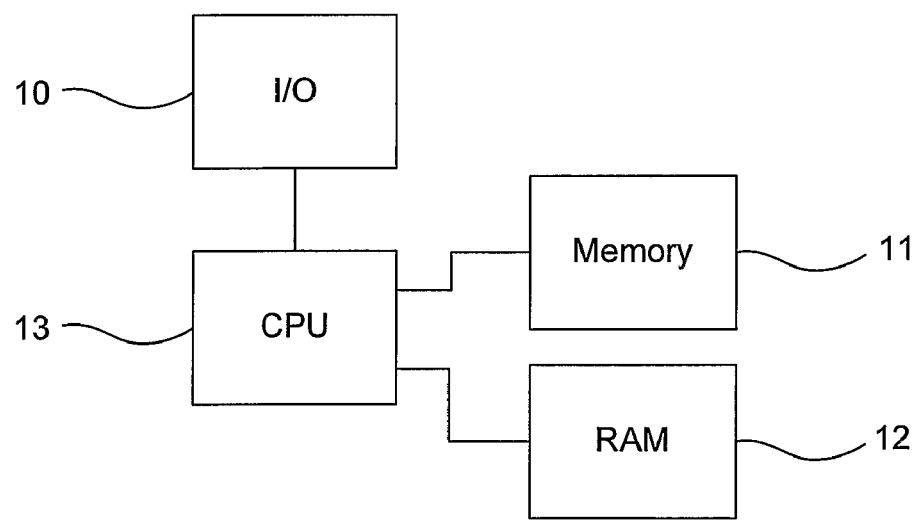
FIG. 2 is a block diagram of certain components of the device according to the invention.

FIG. 2 illustrates certain components of the mobile telephone 1. An input/output interface 10 comprising e.g. a receiver and a transmitter and circuitry for processing input/output signals is arranged to communicate with external electronic devices, e.g. over a wireless or wire based network, such as a mobile network. A non-volatile memory 11 and a RAM (Random Access Memory) 12 are connected to a CPU (Central Processing Unit) 13. Data blocks relating to the processes may be stored in memory 11 when the CPU 13 does not run said processes. When the processes are run, the data blocks may be temporarily stored in RAM 12, which is faster than the memory 11. RAM 12 temporarily stores the data blocks relating to the processes, which are to be or have been processed by the CPU 13. RAM 12 may store data blocks for each ongoing process.

RAM 12 may also be adapted to implement any number of signal buffers for storing data blocks of signals running in the system in which RAM 12 is implemented.

RAM 12 may be adapted for dynamic memory allocation, wherein memory frames are allocated in real-time in a predetermined number of different memory frame sizes, which sizes are pre-defined. The memory frame sizes may be determined. Memory frames that have been allocated may subsequently be de-allocated and are e.g. managed by means of a memory list, in which the addresses of the allocated memory frames and their sizes are stored. If no memory frame is available among released memory frames having a size sufficiently large to store a data block of a certain size a new memory frame having another pre-defined size will be allocated.

The sizes of the memory frames may be determined on a computer system other than in the device in which the memory frames should be used. Alternatively, the sizes of the memory frames are determined within the system in which they should be used by the CPU 13.

Then, the method according to the invention may be run in real time, such as when processing capacity is available, in response to predetermined events such as when a maximum write/read to/from the memory per time unit is reached, or at predetermined time intervals. To determine the sizes of memory frames such that as little slack as possible will be generated, the buffer size requirements of at least one process is evaluated, i.e. the size of all conceivable data blocks relating to that process are examined. The more processes of a system that are evaluated together, the more accurate will the size of the memory frames be determined, and thus the less slack will be generated in total when running the process(es). Consequently, it is an advantage if as many processes as possible are evaluated simultaneously, e.g. all processes that are known when the system including RAM 12 is set up.

Figures 3, 6:
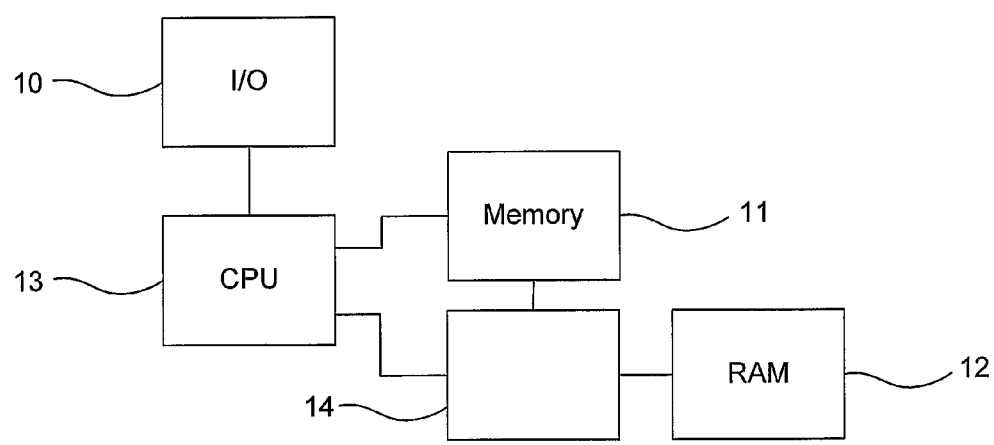
FIG. 3 is a block diagram of three processes comprising data blocks having different sizes.
FIG. 6 is a block-diagram of certain components of a second embodiment of the device according to the invention.

FIG. 3 illustrates three processes, Process A, Process B, and Process C. Any number of processes may be evaluated together. Process A comprises six data blocks 101-106, Process B comprises 7 data blocks 111-117, and Process C comprises 5 data blocks 121-125. Each data block 101-106, 111-117, 121-125 has a specific size, i.e. comprises a specific number of data bits, indicated by a numeral in each data block 101-106, 111-117, 121-125. For processes in a mobile telephone 1, the number of data block sizes may e.g. be 300. However, any number of data block sizes may be used. The data blocks 101-106, 111-117, 121-125 of Process A, Process B, and Process C constitute a set of data blocks, set ABC, when they are evaluated together. Alternatively, the processes are evaluated separately wherein the data blocks of each process is a separate set of data blocks.

According to the method of the invention, a data block size distribution for at least one set of data blocks is determined, such as the set ABC. The number of data blocks having a particular size is counted to generate the distribution.

In FIG. 4a the distribution of set ABC is illustrated. In the first column, the number of data blocks of a particular size within the set ABC is illustrated; in the second column, the size of the data block is illustrated; and in the third column, the predicted slack if the data block size would be merged with another data block size within the distribution is illustrated. According to one embodiment the predicted slack may be defined as follows:

(Predicted slack for data block having data block size P)= (Number of data blocks of size P)×((data block size to be merged with data block size P)−(data block size P)). The data block size to be merged with data block size P may e.g. any following data block size within the data block size distribution. In this embodiment, only data block sizes that actually are used by the processes are utilized. This is an advantage, as it will generate less slack than if data block sizes not used by the system were utilized.

One embodiment for reducing the number of data block sizes of the data block size distribution, and thus determining the sizes of the memory frames, are illustrated in FIG. 4a-4e. In this embodiment, the number of memory frame sizes is assumed to be three, but may be any number in other embodiments. The number of data block sizes of the set ABC is seven. The number of data block sizes are reduced by iteratively merging a first data block size with a second data blocks size of the data block size distribution until the number of data block sizes of the data block distribution corresponds to the number of sizes of the memory frames. The second data block size is larger than the first data block size and the size of the merged data block corresponds to the second data block size.

The data block size to merge with another data block size is determined based on a slack prediction algorithm, as will be explained below.

First, the data block size distribution of a set of data blocks is determined. Then, the slack prediction algorithm is utilized to find candidates to be merged with another data block size. According to one embodiment of the slack prediction algorithm, the data block size that has the lowest predicted slack is selected to be merged with another data block size, but any larger data block size can be selected, as will be discussed below. In FIG. 4a, data block size 3 will generate the least slack if it is merged with data block size 4. In FIGS. 4a-4e, the total slack of all eliminations made is registered. However, this is not necessary in all embodiments of the invention.

FIG. 4b illustrates the remaining distribution of data block sizes after data block size 3 has been merged with data block size 4. The number of data blocks having the first data block size has been added to the number of data blocks having the second data block size, i.e. the number of data blocks having data block size 3 has been added to the number of data blocks having data block size 4. Then, the new predicted slack is calculated as described above for each data block size. For the remaining data block distribution of FIG. 4b it may be determined that merging data block size 10 with data block size 11 will generate the least slack in the next iteration.

FIG. 4c illustrates the remaining distribution of data block sizes after eliminating data block size 10 and the next iteration of the elimination of data block sizes. Data block size 10 is merged with data block size 11, wherein the number of data blocks having data block size 11 within the distribution of FIG. 4c has been increased by two to 5. After determining the predicted slack, it may be determined that merging data block size 5 with data block size 6 will generate the least slack in the next iteration.

FIG. 4d illustrates the remaining distribution of data block sizes after eliminating data block size 5 and the next iteration of the elimination of data block sizes. Data block size 5 is merged with data block size 6, wherein the number of data blocks having data block size 6 within the distribution of FIG. 4d has been increased by 3 to 6. After determining the predicted slack, it may be determined that merging data block size 4 with data block size 6 will generate the least slack in the next iteration.

FIG. 4e illustrates the remaining distribution of data block sizes after eliminating data block size 4 and the next iteration of the elimination of data block sizes. Data block size 4 is merged with data block size 6, wherein the number of data blocks having data block size 6 within the distribution of FIG. 4e has been increased by 4 to 10. Now, the remaining distribution of data block sizes comprises 3 different sizes, i.e. the same number as the number of memory frames, wherein the iteration is ended. The sizes of the memory frames to be used for the system in which the processes are to be implemented are determined as the sizes of the data block sizes of the remaining distribution. In the embodiment of FIGS. 4a-4e, the sizes of the memory frames are determined to be 6, 8 and 11.

As can be seen in the embodiment of FIGS. 4a-4e, the largest data block size is not eliminated, as the size of the eliminated data block size is always smaller than the data block size with which it is merged.

In the embodiment above, only one data block size is eliminated in each iteration. However, more than one, i.e. at least one, data block size may be eliminated in each iteration. For example the slack prediction algorithm may entail that the n data block sizes having the lowest predicted slack should be incorporated into another data block size being larger than said data blocks having the lowest predicted slack. Alternatively, a plurality of data block sizes are merged with different larger data block sizes in each iteration.

According to another slack prediction algorithm, the consequence of eliminating a certain data block size is evaluated before one data block size actually is selected to be merged with another data block size. It may not always be optimum for the total slack or the predicted slack of the data block sizes of a following distribution to select, in the current distribution, the data block size that is predicted to generate the least slack in the current distribution. The number of following distributions to evaluate may e.g. be set depending on the available processing resources. Thus, in a portable device, the number of following possible distributions, or iterations, to evaluate may e.g. be 1-3, whereas in computer all following possible distributions may be evaluated. Also, if the method is run in real time, the number of following iterations to evaluate may be set e.g. in dependence of the number of data block sizes of the current data block distribution, or in dependence of the number of data block sizes that have been eliminated in total.

FIGS. 5a-5f illustrate the result of a slack prediction algorithm that considers the consequence in future iterations. The initial or current data block size distribution is illustrated in FIG. 5a. The number of sizes of the memory frames is assumed to be four. For each possible future distribution, a slack prediction value (SPV) indicative of how the merging of a certain data block size with another data block size would influence future resulting slack is determined. The slack prediction value may be the sum of the predicted slack for all data block sizes except the largest data block size of the data block size distribution, which would remain if a certain data block size would be eliminated. Thus, before making any elimination in the distribution of FIG. 5a, the consequence of eliminating a certain data block size is determined according to the slack prediction algorithm. FIG. 5b illustrates the consequence of eliminating data block size 4 in the distribution of FIG. 5a, wherein the slack prediction value is 22. FIG. 5c illustrates the consequence of eliminating data block size 5 in the distribution of FIG. 5a, wherein the slack prediction value is 29. FIG. 5d illustrates the consequence of eliminating data block size 6 in the distribution of FIG. 5a, wherein the slack prediction value is 31. FIG. 5e illustrates the consequence of eliminating data block size 8 in the distribution of FIG. 5a, wherein the slack prediction value is 22. The slack prediction values are summarized in column four of the table of FIG. 5a.

As can be seen from FIGS. 5b-5e, the distributions of FIGS. 5b and 5e have the lowest slack prediction value, i.e. 22. Thus, according to one embodiment of the slack prediction algorithm, any of data block sizes 4 or 8 could be selected to be eliminated in the current distribution of FIG. 5a, i.e. the data block that would generate a following distribution having the lowest slack prediction value.

However, the lowest possible slack resulting in the following iteration would be if data block size 5 is eliminated from the distribution of FIG. 5e, wherein the slack would be 3 in the following iteration. Thus, in another embodiment of the slack prediction algorithm also the predicted slack for each data block size in at least one possible following iteration is evaluated, wherein the data block to eliminate in the current distribution that would generate the lowest slack in the following distribution could be chosen according to the slack prediction algorithm.

To have the lowest predicted slack in the following distribution would require eliminating data block size 8 in the distribution of FIG. 5a, which would entail a slack of 9, followed by eliminating data block size 5 in the distribution of FIG. 5e, wherein the total amount of slack would be 12. However, the resulting slack starting from the distribution of FIG. 5a and eliminating data block size 4 and then eliminating data block size 6 from the distribution of FIG. 5b, would generate a total slack of 4+6=10. The resulting slack starting from the distribution of FIG. 5a and eliminating data block size 5 and then eliminating data block size 4 from the distribution of FIG. 5c, would generate a total slack of 3+8=11. The resulting slack starting from the distribution of FIG. 5a and eliminating data block size 6 and then eliminating data block size 4 from the distribution of FIG. 5d, would generate a total slack of 6+4=10. Thus, in this case and starting from the data block size distribution of FIG. 5a it may be determined that eliminating data block size 4 or 6 from the distribution illustrated in FIG. 5a, and than data block size 6 (FIG. 5b) or 4(FIG. 5d) from the following distribution would generate the least slack in total, which in this case would be 10. Consequently, according to another embodiment of the slack prediction algorithm, the data block size to eliminate in the current distribution would be the one that together with a following possible elimination would generate the least slack, e.g. data block size 6 or 4 in FIG. 5a. Thus it may be seen that it is not always optimal to eliminate the data block size that would generate the least slack in each iteration.

According to still an alternative embodiment of the slack prediction algorithm, a weighted slack prediction value (WSPV) for each data block size of the current distribution may be generated. Each weighted slack prediction value is based on the predicted slack of a certain data block size of the current distribution and the slack prediction value of the following distribution, which would be generated if said certain data block size would be eliminated. The weighted slack prediction value is shown in column five of FIG. 5a. The following algorithm may be used for the weighted slack prediction value:

WSPV=$c_1$ (predicted slack data block size P)+$c_2$ (slack prediction value resulting if data block size P is eliminated), wherein $c_1$ and $c_2$ are weighting factors. $C_1$ and $c_2$ may be chosen such that the predicted slack in the current distribution is considered being of greater importance than the associated slack prediction value, e.g. $c_1$=0.75 and $c_2$=0.25. However, other weighting factors and weighting algorithms are possible and have to be tested and evaluated for each particular implementation. Giving the predicted slack a larger weight than the slack prediction value has the advantage that the risk of making an incorrect decision in the current distribution, which has impact on future eliminations, is reduced In the embodiment illustrated in FIGS. 5a-5e, the data block size that is predicted to generate the lowest slack is not chosen to be merged with another data block size, whereby the total slack may be minimized. In stead, the data block size having the lowest weighted slack prediction value is selected to be eliminated in the distribution of FIG. 5a, wherein the distribution of FIG. 5f is generated, which corresponds to the distribution of FIG. 5b. As the number of data block sizes correspond to the number of sizes of the memory frames, the elimination is finished and the sizes of the memory frames are determined as the data block sizes of FIG. 5f.

The evaluation of the consequence of eliminating a certain data block size from a current distribution can be made for any number of future iterations. However, due to the amount of data to process in a real implementation, it may be foreseeable to make such predictions for one or two future possible iterations. In the embodiment illustrated in FIGS. 5a-5e it can be seen that the optimum result would have been achieved by choosing the data block size to eliminate in the current distribution that would generate a following distribution that would have the lowest slack prediction value in a possible following distribution, i.e. the distribution of FIG. 5b having a slack prediction value of 22, which would be generated by eliminating data block size 4 in the distribution of FIG. 5a. The same result would be achieved by eliminating the data block size having the lowest weighted slack prediction value.

As discussed above, the method according to the invention relates to a set of data blocks for at least one predetermined process of a computer based system or a electronic device having a processor. Alternatively, the method according to the invention is applied to at least one set of data blocks that relate to at least one signal. The signals may relate to various functions within the mobile telephone 1, and may be processed by the CPU 13 and temporarily stored in RAM 12, which may implement a signal buffer. A signal may be exchange of information between processes, and may be a set of data blocks stored in a memory buffer, which may be implemented by RAM 12. The data blocks of the signal may be communicated between processes in the system by transferring the possession of data blocks stored in the memory buffer from a first to a second process. The main difference between a process stack and a signal is the time period during which the data blocks are stored in RAM 12. Data blocks of a signal may have a duration in the range of e.g. >5 μs and <1 s, whereas data blocks of a process stack may have a duration of >1 s. As for the processes discussed above, the signals comprise data blocks of various sizes, which may or may not correspond to the sizes of the memory frames for RAM 12. Therefore, a set of data blocks with regard to at least one signal may be gathered and evaluated. More specifically, a data block size distribution for at least one set of data blocks of at least one signal may be determined, such as when data blocks are written into RAM 12.

FIG. 6 illustrates a second embodiment of internal components of the mobile terminal according to the invention. The embodiment according to FIG. 6 basically corresponds to the embodiment of FIG. 2. Therefore, like components have been denoted by the same reference numerals. The CPU 13 and the memory 11 are connected to a means for registering the size of data blocks that are written to RAM 12, or a data block size registration unit 14. The data block size registration unit is arranged to register the size of the data blocks written into RAM 12, and may be implemented as a software unit by the CPU 13 or by a stand-alone hardware component, such as a FPGA (Field Programmable Gate Array), an ASIC (Application Specific Integrated Circuit) or a processor.

The data block size registration unit 14 may be adapted to register the data block size, i.e. the number of bits of the data block, of each data block forwarded to RAM 12. Then, a data block size distribution for the sizes of the data blocks that have been written into RAM 12 may be stored in the memory 11 and updated continuously. Alternatively, the data block size distribution for data blocks written into RAM 12 is stored in a memory integrated with the data block size registration unit 14. Furthermore, the data block size registration unit 14 may also be adapted to register allocation of memory frames, such as the number of allocated memory frames, and the number of allocated memory frames presently being used.

The CPU 13 may evaluate the data block size distribution generated by the data block size registration unit 14. Alternatively, a processing device provided externally to the mobile telephone 1, such as a computer, evaluates the data block size distribution generated by the data block size registration unit 14.

The data block size distribution generated by data block size registration unit 14 may e.g. be evaluated when a predetermined number of data blocks are stored in RAM 12, such as when the number of data blocks stored in RAM 12 is equal to the number of memory frames currently allocated in RAM 12. Then, the data block size registration unit 14 may alert the CPU 13 when local maximums of requested memory resources are required. When the predetermined number of data blocks is stored in RAM 12, the CPU may evaluate the distribution generated by the data block size registration unit 14 to determine the size of memory frames to allocate in the future. Only determining the size of the memory frames in response to reaching a predetermined number of stored data blocks has the advantage that the data processing is limited. However, the size of the memory frames may alternatively be determined at predetermined time intervals. Still alternatively, the size of the memory frames may be generated when a predetermined number of transactions (reads/writes) into RAM 12 per time unit has been reached.

The data block size distribution determined for the signals may be evaluated, and the sizes of the memory frames determined, according to the same principles as described with reference to FIGS. 4a-4e and 5a-5e.

FIG. 7 is a flow-chart of one embodiment of the method according to the invention. In a first step 200, a data block size distribution for at least one set of data blocks is determined. Then, the predicted slack for each data block size of the determined data block size distribution is determined in step 201. The slack prediction value for the current data block size distribution is determined in step 202. In step 203, a predicted effect for a following data block size distribution, which would be generated if two data sizes of the current data block size distribution are merged, is determined, e.g. as described in relation to FIGS. 5a-5e. The effect for any following n data block size distributions may be generated. The effect may e.g. be to determine a slack prediction value for the data size distribution in the following distribution that would result if two data block sizes were merged in the current distribution. In step 204, at least one data block size of the current distribution to be merged with a first data block size of the current data block size distribution is selected based on the slack prediction algorithm. The at least one data block size and the first data block size may be determined by means of the slack prediction algorithm e.g. as described with regard to FIGS. 4a-4b or 5a-5b. However, the data block sizes to be merged can also be determined according to other slack prediction algorithms, which has to tested in each particular implementation. The number of data blocks of the at least one data block size is added to the number of data blocks of the first data block size in step 205. Then, the data block sizes are merged in step 206. In step 207, it is determined whether the number of sizes of the memory frames corresponds to the number of data block sizes remaining in the distribution. If the answer in step 207 is no, the procedure returns to step 201, wherein another data block size of the remaining data block size distribution is eliminated. If the answer in step 207 is yes, the procedure proceeds to step 208, wherein the sizes of the memory frames are determined as the data block sizes of the remaining data block size distribution.

As is appreciated, not all steps illustrated in the flow-chart of FIG. 7 need to be executed in all embodiments of the method according to the invention. For example, step 202 and 203 need not be carried out if the embodiment illustrated with reference to FIGS. 4a-4e should be implemented. Furthermore, it is also possible to eliminate more than one data block size in each iteration. Any number of data blocks may be incorporated into the same larger data block size in one iteration if it is determined that they will be incorporated into the larger data block size in a following iteration anyway, which e.g. may be determined based on the possible determined data block size distributions. Also, it is possible to merge a first and a second, and a third and a fourth data block size in one iteration. For example, in the embodiment of FIGS. 5a-5e if data block size 8 is incorporated into data block size 11, the distribution of FIG. 5e will be generated. Then, it may be determined that the data block size from the generated distribution having the lowest predicted slack should directly be merged with a larger data block size, i.e. that data block size 5 should be merged with data block size 6 in the distribution of FIG. 5e. Thus, both data block size 8 and 5 is eliminated in one iteration starting from the distribution of FIG. 5a, whereby the number of data block sizes of the distribution of FIG. 5a is decreased by two in one iteration. As is understood, any number of data block sizes may be eliminated in one iteration if any number of following distributions has been generated.

The method according to the invention may be implemented by software. A computer program product comprising computer program code means to execute the method when said computer program code means are run by an electronic device having computer program capabilities may implement the invention. The electronic device may be any processing device, such as a computer or a mobile telephone 1 as described above. The computer program code means may be embodied on a computer readable medium.

The present invention has been described above with reference to specific embodiments. However, other embodiments than the above described are possible within the scope of the invention. Different method steps than those described above, performing the method by hardware or software, may be provided within the scope of the invention. The different features and steps of the invention may be combined in other combinations than those described. The scope of the invention is only limited by the appended patent claims.

The invention claimed is:

1. A method of determining a size of each of a predetermined number of memory frames of a memory adapted to store data blocks in data frames of a predetermined number of different sizes to be allocated, the method comprising: determining a data block size distribution for at least one set of data blocks, each data block of the set of data blocks having a particular size, wherein the data block size distribution is determined by:
iteratively eliminating at least one data block size of the data block size distribution until a number of data block sizes of the distribution corresponds to the number of sizes of the predetermined number of memory frames by merging the at least one data block size with another data block size of a possible data block size distribution to generate a merged data block size, the other data block size being larger than the at least one data block size and the size of the merged data block size corresponding to the other data block size, wherein the data block sizes to merge are selected based on a slack prediction algorithm, according to which the at least one data block size and the other data block size are selected such that merging the at least one data block size with the other data block size contributes a minimum amount of slack during at least one iteration; and
determining each size of the memory frames as one size of the data block sizes of the determined data block size distribution that remain after eliminating at least one data block size, and such that the sizes of the memory frames are different.

2. The method of claim 1, comprising, for each iteration, adding the number of data blocks having the at least one data block size to the number of data blocks having the other data block size when the at least one data block size is merged with the other data block size.

3. The method of claim 1, comprising, for each data block size except a largest data block size of the distribution and for each iteration, determining a predicted slack that would result if the at least one data block size would be incorporated into a larger data block size of the determined distribution.

4. The method of claim 2, wherein the larger data block size is the next larger data block size of the determined distribution that has not been eliminated.

5. The method of claim 1, wherein the slack prediction algorithm comprises, for each iteration, determining which of the data block sizes of the distribution that have not been eliminated would generate a lowest slack if that data block size would be incorporated into a larger data block size, and selecting the determined data block size to be one of the at least one data block size.

6. The method of claim 1, wherein the slack prediction algorithm comprises, for each iteration, generating a slack prediction value indicative of a total predicted slack for the data block sizes of the distribution that have not been eliminated.

7. The method of claim 1, wherein the set of data blocks relates to data blocks for at least one predetermined process of a system comprising a memory.

8. The method of claim 1, wherein the set of data blocks relates to data blocks of at least one signal.

9. The method of claim 7, comprising determining the data block size distribution in run-time when data blocks are written into the memory.

10. The method of claim 1, wherein an effect in at least one temporally following possible data block size distribution of eliminating a certain data block size of a current possible data block size distribution is checked before any data block size is eliminated in a current distribution.

11. The method of claim 10, comprising dynamically changing a number of temporally following possible data block size distributions based on the number of data block sizes of the current possible data block size distribution.

12. The method of claim 10, comprising determining each possible data block size distribution that can be generated based on the current data block size distribution, and generating a slack prediction value for each of the current and the possible data block size distributions.

13. The method of claim 12, comprising selecting a first of the at least one data block sizes from the current data block size distribution as the data block size that would generate the lowest predicted slack in total in the current and the following iteration.

14. The method of claim 13, comprising selecting a second of the at least one data block size from the following iteration, and merging the second data block size with another data block size of the following data block distribution.

15. The method of claim 1, wherein the other data block size is the second largest data block size of the at least one data block size within the current possible data block size distribution.

16. A processing device configured to determine a size of each of a predetermined number of memory frames of a memory according to the method of claim 1.

17. A computer-readable medium having stored thereon instructions which, when executed by an electronic processor, cause the processor to perform a method of determining a size of each of a predetermined number of memory frames of a memory adapted to store data blocks in data frames of a predetermined number of different sizes to be allocated according to claim 1.

* * * * *

UNITED STATES PATENT AND TRADEMARK OFFICE
CERTIFICATE OF CORRECTION

PATENT NO. : 7,689,798 B2  
APPLICATION NO. : 11/576848  
DATED : March 30, 2010  
INVENTOR(S) : Åberg et al.

Page 1 of 1

It is certified that error appears in the above-identified patent and that said Letters Patent is hereby corrected as shown below:

Title Page, in Field (75), under "Inventors", in Column 1, Line 1, delete "Malmö" and insert -- S. Sandby --, therefor.

Title Page 2, in Field (56), under "OTHER PUBLICATIONS", in Column 1, Line 2, delete "Contraints"" and insert -- Constraints" --, therefor.

In Fig. 5a, Sheet 4 of 5, under "WSPV", in Line 4, delete "12,25" and insert -- 12.25 --, therefor.

In Column 3. line 5, delete "unit" and insert -- unit. --, therefor.

In Column 8, Line 46, after "factors." delete "$C_l$" and insert -- $c_l$ --, therefor.

In Column 8, Line 56, delete "reduced" and insert -- reduced. --, therefor.

Signed and Sealed this  
Nineteenth Day of July, 2011

David J. Kappos  
*Director of the United States Patent and Trademark Office*